United States Patent [19]

Seah et al.

[11] Patent Number: 5,336,054
[45] Date of Patent: Aug. 9, 1994

[54] AUTOMATIC WATER SHUT-OFF DISPENSERS

[75] Inventors: Khen H. Seah; Yeow S. Heng; Chong W. Chua, all of Singapore, Singapore

[73] Assignee: Port of Singapore Authority, Singapore, Singapore

[21] Appl. No.: 900,725

[22] Filed: Jun. 18, 1992

[30] Foreign Application Priority Data

Jun. 20, 1991 [GB] United Kingdom ............... 9113301

[51] Int. Cl.$^5$ ............................................. F04B 49/06
[52] U.S. Cl. .......................................... 417/2; 417/53; 417/63; 417/36
[58] Field of Search ................... 417/2, 12, 36, 63, 53

[56] References Cited

U.S. PATENT DOCUMENTS

| | | | |
|---|---|---|---|
| 3,800,205 | 3/1974 | Zalar | 417/36 |
| 4,121,094 | 10/1978 | DiVito et al. | 417/36 |
| 4,767,280 | 8/1988 | Markuson et al. | 417/63 |
| 4,856,047 | 8/1989 | Saunders | 379/51 |
| 5,064,349 | 11/1991 | Turner et al. | 417/36 |
| 5,190,442 | 3/1993 | Jorritsma | 417/12 |

FOREIGN PATENT DOCUMENTS

| | | |
|---|---|---|
| 1095144A | 5/1984 | U.S.S.R. |
| 1308993A1 | 5/1987 | U.S.S.R. |
| 1334545 | 10/1973 | United Kingdom |
| 1501740 | 2/1978 | United Kingdom |

*Primary Examiner*—Richard A. Bertsch
*Assistant Examiner*—David W. Scheuermann
*Attorney, Agent, or Firm*—Karquist Sparkman Campbell Leigh & Whinston

[57] ABSTRACT

A pumping arrangement for pumping water to ships comprises a pump having an inlet and an outlet, a level sensor, connectable to the outlet, for insertion into a water tank, and a control arrangement associated with the level sensor. The control arrangement de-activates the pump in response to a signal from the level sensor so as to avoid over-filling of the tank. The pumping arrangement further comprises transmitting means to transmit a signal at the same time as the control arrangement de-activates the pump. Such a signal is transmitted to, for example, a paging unit. Several pumping arrangements may be used at once with several ships, the paging unit being adapted to inform the operator when a given pumping arrangement has filled a water tank.

8 Claims, 1 Drawing Sheet

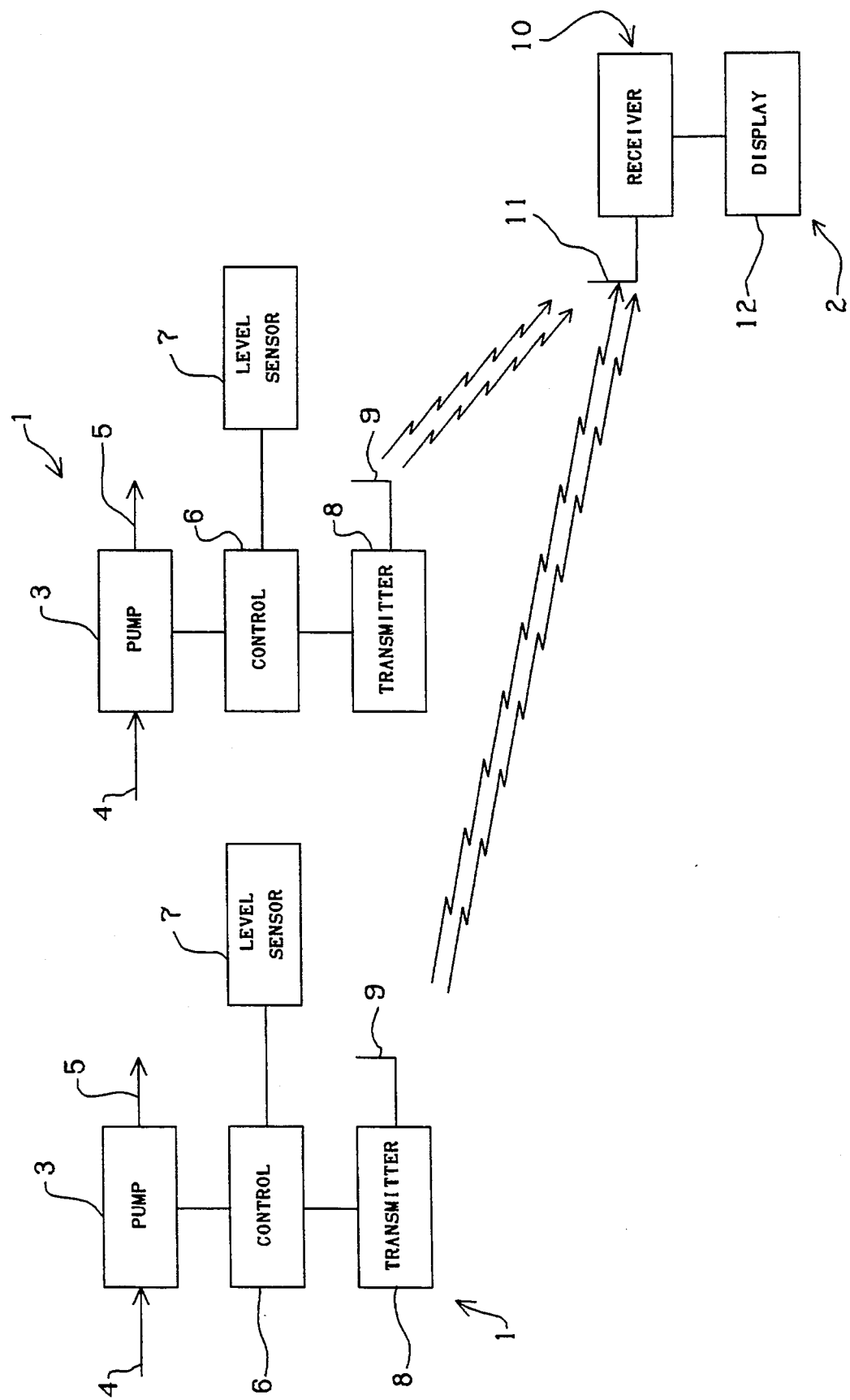

AUTOMATIC WATER SHUT-OFF DISPENSERS

BACKGROUND OF INVENTION

The present invention relates to a pumping arrangement and more particularly to a pumping arrangement adapted to pump water.

A pumping arrangement which pumps water is often used to pump water into a water tank present in a ship, when the ship has docked in a harbour. Often the water tank in the ship is of a very considerable size and may take a long time to become filled with water. A single operator may thus simultaneously operate a relatively large number of pumps which are filling the tanks on a large number of ships in the harbour region. However, this does lead to the disadvantage that the operator may not be present when the tank on the ship becomes full. This means that water may be wasted. The present invention therefore seeks to provide an improved pumping arrangement.

SUMMARY OF THE INVENTION

According to this invention there is provided a pumping arrangement adapted to pump a fluid, the pumping arrangement comprising a pump, an inlet for the pump and an outlet for the pump, the pump being associated with a control arrangement which is associated with a level sensor adapted to be inserted into a tank connected to the outlet of the pump, the control arrangement being adapted to deactivate the pump when the level sensor senses fluid, the arrangement further including a transmitter adapted to transmit a signal when the control unit de-activates the pump.

Preferably a paging unit is also provided, the paging unit being adapted to receive the signal transmitted by the transmitter. Conveniently the paging unit is adapted to provide an indication identifying the transmitter when said signal is received.

The paging unit may include a display adapted to provide a visible display identifying the transmitter.

The pumping arrangement may be adapted to pump water.

A pumping system may be provided comprising a plurality of pumping arrangements as described above with one or more paging units adapted to receive the signals transmitted by the transmitters and to provide an indication identifying the transmitter transmitting any signal received thereby.

DESCRIPTION OF THE DRAWING

In order that the invention may be more readily understood, and so that further features thereof may be appreciated, the invention will now be described, by way of example, with reference to the accompanying drawing.

FIG. 1 is a schematic diagram of a pumping arrangement in accordance with the invention.

DESCRIPTION OF A PREFERRED EMBODIMENT

Referring to FIG. 1, a pumping arrangement in accordance with the invention comprises a main pumping arrangement 1, which is associated for use with a receiver or "pager" 2.

The main pumping arrangement 1 comprises a pump 3 which may be of any appropriate design having an inlet 4 adapted to be connected to an appropriate source of water and an outlet 5 adapted to be connected to an appropriate inlet manifold of a ship or to be connected in some other way to discharge water into a water tank present in a ship.

A control arrangement 6 is provided to control the pump. The control arrangement may have appropriate manually operable controls, and may thus activate the pump 3 and may also de-activate the pump 3. A level sensor 7 is provided which is associated with the control 6. The level sensor 7 is of any appropriate design and is adapted to be lowered into the water tank to be filled by the pump, so that the level sensor is contacted by water in the tank when water in the tank has reached a desired level.

The control arrangement 6 is also associated with a transmitter 8 which transmits radio signals of an appropriate frequency. The signals transmitted by the transmitter 8 are coded with a code which is particular to that transmitter. The transmitter is associated with an aerial or antenna 9 which transmits the coded signal, which is adapted to be picked up by a receiver 10 which is associated with a further aerial or antenna 11. The receiver 10 and the aerial 11 comprise a "paging" unit 2. The receiver 10 is associated with a display 12 and the arrangement is such that when a particular coded signal is received a particular code number is displayed on the display 12, and the pager emits an audible sound.

It is to be appreciated that when filling a tank present on a ship a pumping arrangement 1 may be located adjacent the ship with the inlet 4 of the pump connected to a water supply hydrant, and the outlet of the pump 5 connected to the inlet manifold of the tank to be filled. The level sensor 7 will be located in the tank to be filled at an appropriate level. Manually operable components on the control may then be operated so that the pump is activated. Water will then flow into the tank.

When the water level in the tank is such that the water touches the level sensor the control 6 will deactivate the pump so that no further water is introduced into the tank and will also activate a transmitter 8. The transmitter 8 will then transmit its coded signal which will be picked up by the receiver 10. An appropriate display will then be presented on the display 12 and, of course, an audible alarm signal will be generated by the receiver 10, as is conventional in a pager.

It is envisaged that a single operative, using equipment of the type described above, will be able to fill the tanks on a large number of ships without wasting water, and also without wasting time. The operative would initially connect up the inlet and outlet of the pump 3 in the manner described above and then switch the pump 3 on so that water is flowing into the tank. When the tank is full the transmitter 8 transmits a signal which is picked up by the paging device 2 which the operative will have about his person. This will give an indication as to precisely which pump has been de-activated because the associated tank is full. Thus the operative may be moving about the dock area, commencing filling operations on other tanks until he is effectively advised by the pager that the first tank is full. The operative may then move the pumping equipment from the first tank to another tank that requires to be filled.

It is envisaged that the pump arrangement 1 may be formed as an integral unit adapted to be mounted on the back of a lorry and adapted to be lowered from the lorry to the wharf side when the pumping arrangement is to be used. The paging device 2 may be built into the cab of the lorry or may be a totally portable device.

The control unit 6 may have a "paging stop" button which can be depressed in order to stop the transmitter transmitting its signal, although the transmitter may be programmed to transmit its signal for a predetermined period of time and then automatically stop transmitting its signal.

The level sensor 7 may be connected to the control unit by means of a quick release coupling.

We claim:

1. A pumping system for simultaneously supplying a fluid to plural tanks, comprising plural pumping arrangements each adapted to pump a fluid, each pumping arrangement comprising a pump, an inlet for the pump and an outlet for the pump, the pump being associated with a control arrangement which is associated with a level sensor, the control arrangement and level sensor adapted to be moved sequentially from tank to tank, with the level sensor adapted to be inserted sequentially into one of said plural tanks, said one tank being connected to the outlet of the pump, the control arrangement being adapted to de-activate the pump when the level sensor senses fluid, each pumping arrangement further including a transmitter adapted to transmit a signal when the control arrangement de-activates the pump.

2. A pumping system according to claim 1 in combination with a paging unit, the paging unit being adapted to receive the signal transmitted by each pumping arrangement transmitter.

3. A pumping system according to claim 2 wherein the paging unit is adapted to provide an indication identifying the transmitter, when said signal is received.

4. A pumping system according to claim 3 wherein the paging unit includes a display adapted to provide a visible display identifying the transmitter.

5. A pumping system according to any one of the preceding claims adapted to pump water.

6. A pumping system according to claim 1 further comprising one or more paging units adapted to receive the signals transmitted by the transmitters and to provide an indication identifying the transmitter transmitting any signal received thereby.

7. A method of simultaneously filling a plurality of tanks, comprising the steps of:
 a) lowering a first level sensor into one of the tanks to indicate when the tank is full;
 b) coupling a first pump to fill the one tank from a fluid source;
 c) starting the first pump;
 d) lowering a second level sensor into a second one of the tanks to indicate when the tank is full;
 e) coupling a second pump to fill the second tank from a fluid source;
 f) starting the second pump;
 g) stopping the first pump in response to the first level sensor indicating a full level;
 h) transmitting a first signal when the first pump is stopped;
 i) stopping the second pump in response to the second level sensor indicating a full level;
 j) transmitting a second signal when the second pump is stopped;
 k) equipping an operative with a pager device responsive to the first and second signals;
 l) removing the respective first and second sensors, and de-coupling the respective first and second pumps, after receipt of the respective first and second signals by the pager; and
 m) repeating steps a-1 with other tanks requiring filling.

8. A pumping system according to claim 1, wherein the tanks are located at plural berths along a wharf.

* * * * *